(12) United States Patent
Wang Lee

(10) Patent No.: US 7,380,934 B1
(45) Date of Patent: Jun. 3, 2008

(54) SPECTACLES WITH ADJUSTABLE NOSE PADS

(76) Inventor: Anthony Wang Lee, No. 473, Chung-Shan S. Rd., Yung-Kang City, Tainan Hsien (TW)

( * ) Notice: Subject to any disclaimer, the term of this patent is extended or adjusted under 35 U.S.C. 154(b) by 0 days.

(21) Appl. No.: 11/804,079

(22) Filed: May 17, 2007

(51) Int. Cl.
*G02C 1/02* (2006.01)

(52) U.S. Cl. .......................... 351/137; 351/76; 351/78; 351/136; 351/138

(58) Field of Classification Search ................ 351/137, 351/138, 136, 76, 78, 77, 79, 80, 65, 41
See application file for complete search history.

(56) References Cited

U.S. PATENT DOCUMENTS

| 4,280,758 | A  | * | 7/1981 | Flader et al. | ............ | 351/55 |
| 6,520,636 | B2 | * | 2/2003 | Saitoh et al. | ............ | 351/137 |

* cited by examiner

*Primary Examiner*—Hung X. Dang
(74) *Attorney, Agent, or Firm*—William E. Pelton, Esq.; Cooper & Dunham LLP

(57) ABSTRACT

Spectacles have a frame, a pair of lenses and two nose pads. The frame has two lens mounts and a bridge connecting the lens mounts. The pair of lenses is mounted on the lens mount. Each nose pad has a top and a gear wheel pivoted on the bridge and having a circumferential surface and multiple driving teeth formed on the circumferential surface and meshing with the driving teeth of the gear wheel of the other nose pad. A person can manually turn either of the nose pads to adjust to a desired angle so as to conform to the person's nose, such that the spectacles can be comfortably worn on the person's nose.

6 Claims, 6 Drawing Sheets

SPECTACLES WITH ADJUSTABLE NOSE PADS

BACKGROUND OF THE INVENTION

1. Field of the Invention

The present invention relates to spectacles, and more particularly to spectacles that have adjustable nose pads to be comfortably worn on a person's nose.

2. Description of Related Art

Conventional spectacles have a frame, a pair of lenses and two nose pads. The frame has two lens mounts, a bridge and two temples. Each lens mount has an inner end and an outer end. The bridge is connected between the inner ends of the lens mounts. The temples are respectively pivoted at the outer ends of the lens mounts to be respectively worn on a person's ears. The pair of lenses are respectively mounted on the lens mounts. The nose pads are mounted on the bridge and tilt toward each other to form an angle conforming to the person's nose, so that the nose pads can be comfortably worn on the person's nose. The nose pads are mounted on the bridge in two manners.

A first manner is to connect each nose pad and the bridge with a supporting wire. The supporting wire has a proximal end welded on the bridge and a distal end attached to the nose pad. Therefore the nose pads are mounted on the bridge through the supporting wires. However, the supporting wire is easily bent and deformed changing the angle between the nose pads, so the angle between the nose pads no longer conforms to the person's nose and the spectacles can no longer be worn comfortably.

A second manner is to form or mount the nose pads on the bridge to make the angle between the nose pads unchangeable. However, the angle between the nose pads formed on the bridge cannot be adjusted, so the spectacles are unable to fit multiple persons.

SUMMARY OF THE INVENTION

The primary objective of the present invention is to provide spectacles with adjustable nose pads whose angle can be tailored, without using tools, to comfortably fit multiple people and returned to this position if an impact causes the nose pads to change angle. The spectacles in accordance with the present invention have a frame, a pair of lenses and two nose pads. The frame has two lens mounts and a bridge connecting the lens mounts. The pair of lenses is mounted on the lens mount. The nose pads are attached to the bridge and each nose pad has a top and a gear wheel formed on the top, pivoted on the bridge and having a circumferential surface and multiple driving teeth. The driving teeth are formed on the circumferential surface of the gear wheel and mesh with the driving teeth of the gear wheel of the other nose pad.

A person can manually turn either of the nose pads to simultaneously rotate both of the nose pads to a desired angle so as to conform to the person's nose, such that the spectacles can be comfortably worn on the person's nose. Further, because the angle between the two nose pads is adjustable, the nose pads can easily be tailored to multiple persons.

Additionally, if the nose pads are inadvertently moved away from an original position, the person is easily able to return the nose pads to the original position without using tools.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
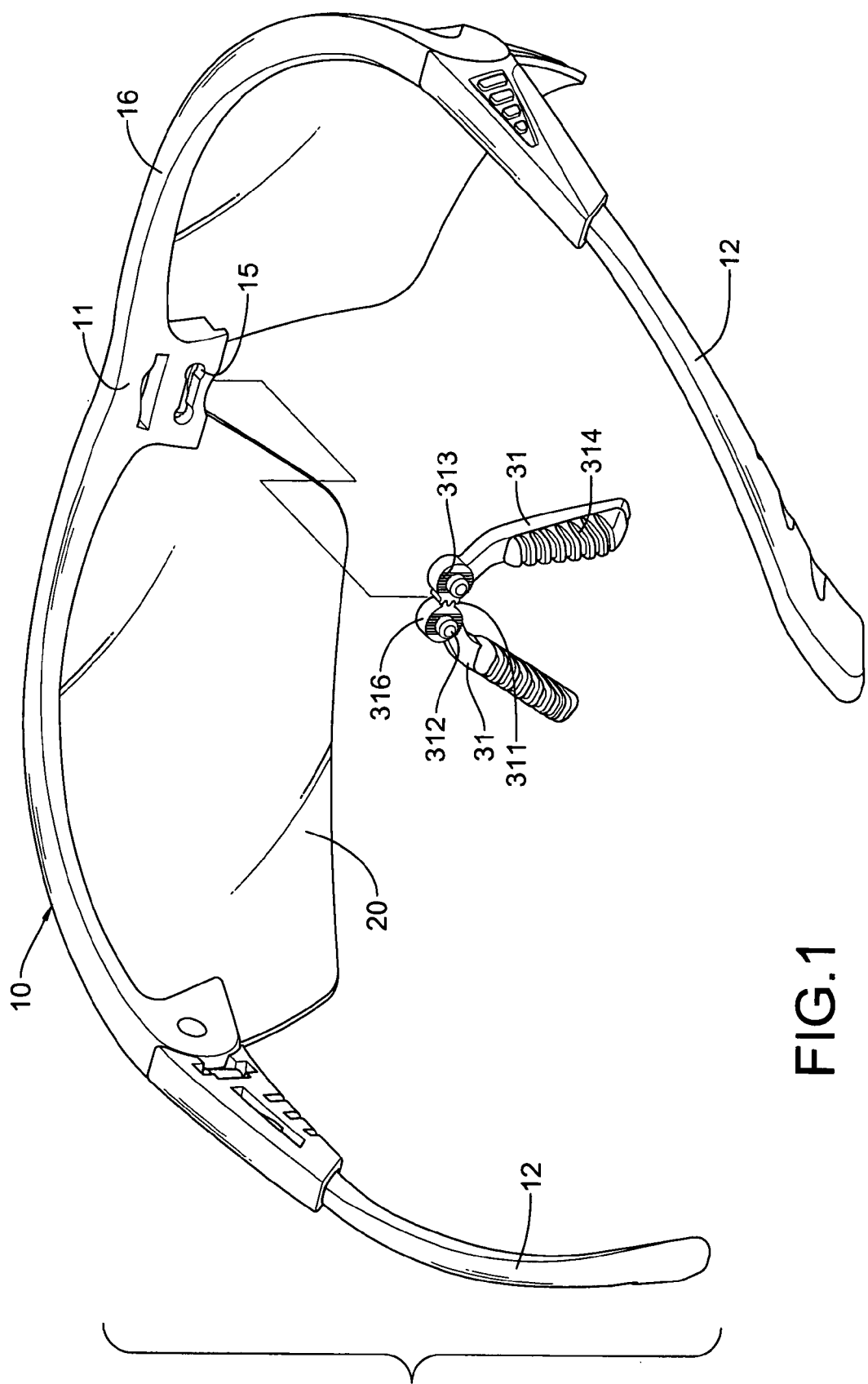
FIG. 1 is a partially exploded perspective view of spectacles with adjustable nose pads in accordance with the present invention.
Figure 2:
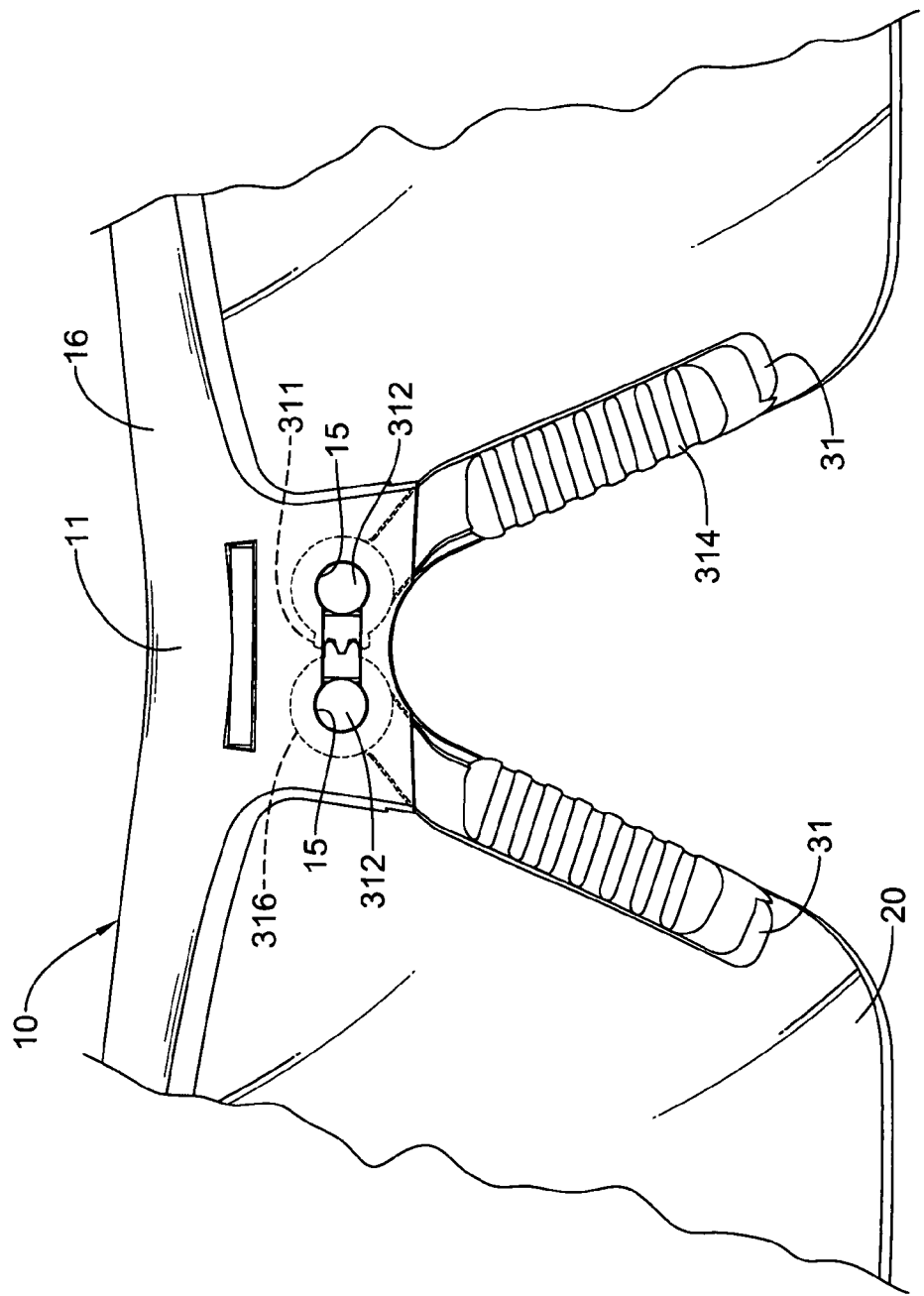
FIG. 2 is an enlarged rear view of the spectacles in FIG. 1 showing the nose pads mounted on the bridge.
Figure 4:
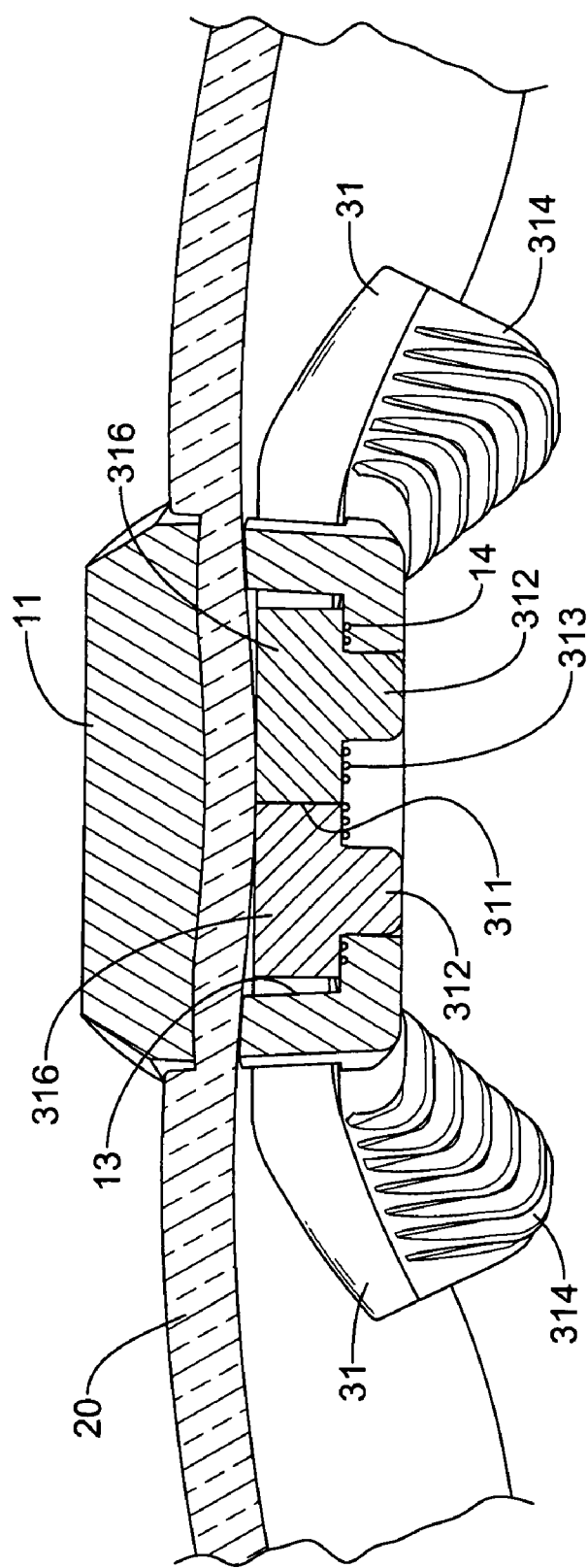
FIG. 4 is an enlarged cross-sectional top view of the spectacles in FIG. 1 showing the optional mounting chamber.

With reference to FIGS. 1, 2 and 4, spectacles with adjustable nose pads in accordance with the present invention comprise a frame (10), a pair of lenses (20) and two nose pads (31).

The frame has two lens mounts (16), a bridge (11) and a head holder (12).

Each lens mount (16) has an inner end and an outer end.

The bridge (11) connects the inner ends of the lens mounts (16) and has a rear, a bottom and an optional mounting chamber (13). The mounting chamber (13) is formed inside the bridge (11) and has an inner wall, an opening, two pivot holes (15) and multiple optional limiting grooves (14). The opening of the mounting chamber (13) communicates with the bottom of the bridge (11). The pivot holes (15) are formed in the inner wall of the mounting chamber (13) and may communicate with the rear of the bridge (11). The limiting grooves (14) are formed in the inner wall of the mounting chamber (13).

The head holder (12) is mounted on the outer ends of the lens mounts (16) so that a person can put the head holder (12) on his/her to wear the spectacles. The head holder (12) may be a fastening belt or two temples. The fastening belt connects the outer ends of the lens mounts (16) to be put around the person's head. The temples are respectively pivoted at the outer ends of the lens mounts (16) to be respectively worn on a person's ears.

The pair of lenses (20) are mounted on the lens mounts (16) and may be a sole lens mounted on the lens mounts (16) and spanning the bridge (11) or two individual lenses mounted respectively on the lens mounts (16).

The nose pads (31) are attached to the bridge (11), and each of the nose pads (31) has a top end, an outer surface a gear wheel (316) and multiple optional flutes (314).

The gear wheel (316) is formed on the top end of the nose pad (31), is mounted rotatably on the bridge (11) adjacent to the other nose pad (31) and has a circumferential surface, two opposite end faces, multiple driving teeth (311), an optional shaft (312) and multiple optional friction ribs (313).

The gear wheels (316) of the nose pads (311) may be inserted in the mounting chamber (13) in the bridge (11) and correspond respectively to the pivot holes (15) of the mounting chamber (13) ensuring the gear wheels (316) can rotate smoothly in the mounting chamber (13) and are protected from dust.

Figure 3:
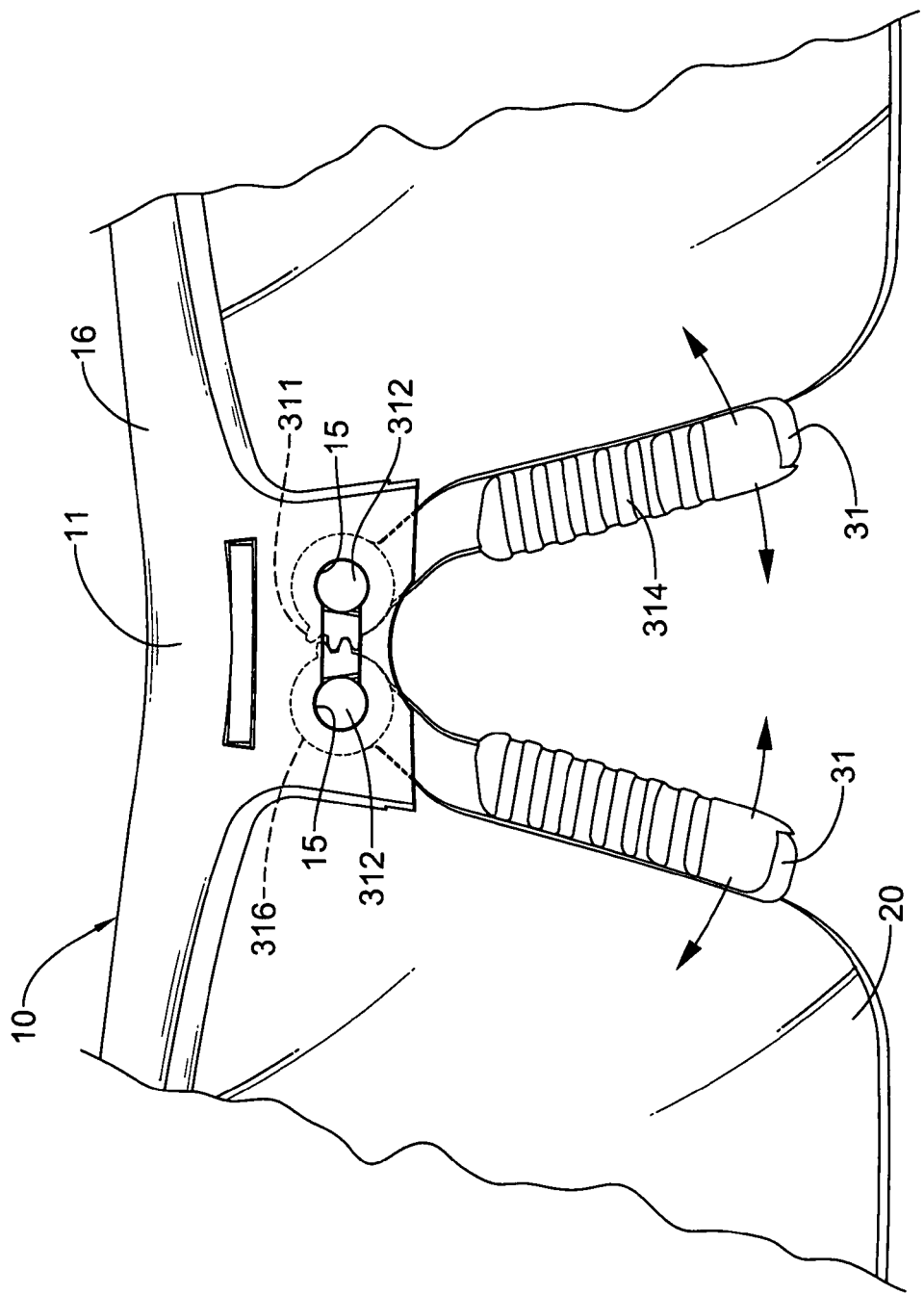
FIG. 3 is an operational enlarged rear view of the spectacles in FIG. 1 showing the nose pads mounted on the bridge.

At least one of the end faces of the gear wheel (316) abuts tightly with the bridge (11) to provide enough friction between the gear wheel (316) and the bridge (11) for positioning the gear wheel (316) at a proper angle when the gear wheel (316) rotates. The end faces of the gear wheel (316) may abut tightly with the inner wall of the mounting chamber (13) to abut tightly with the bridge (11). With further reference to FIG. 3, the driving teeth (311) are formed on the circumferential surface of the gear wheel (316) and mesh with the driving teeth (311) on the gear wheel (316) of the other nose pad (31). With the meshing driving teeth (311) between the two nose pads (31), the nose pads (31) rotate simultaneously with respect to each other when either of the nose pads (31) is turned. Therefore, by turning the nose pads (31), the person is conveniently able to adjust the relative positions of the nose pads (31) to form a comfortable fit to the person's nose. Consequently, the nose pads (31) can be worn on the person's nose. Henceforth, the nose pads (31) are adjustable to fit multiple persons. The shaft (312) is formed on and protrudes from one of the end faces of the gear wheels (316) and is mounted rotatably in a corresponding pivot hole (15) of the mounting chamber (13), allowing the gear wheels (316) to be rotated in relation to the bridge (11) and prevent the gear wheels (316) from detaching.

The friction ribs (313) are formed on and protrude from at least one of the end faces of the gear wheel (316), and selectively engage with the limiting grooves (14) in the inner wall of the mounting chamber (13).

Figure 5:
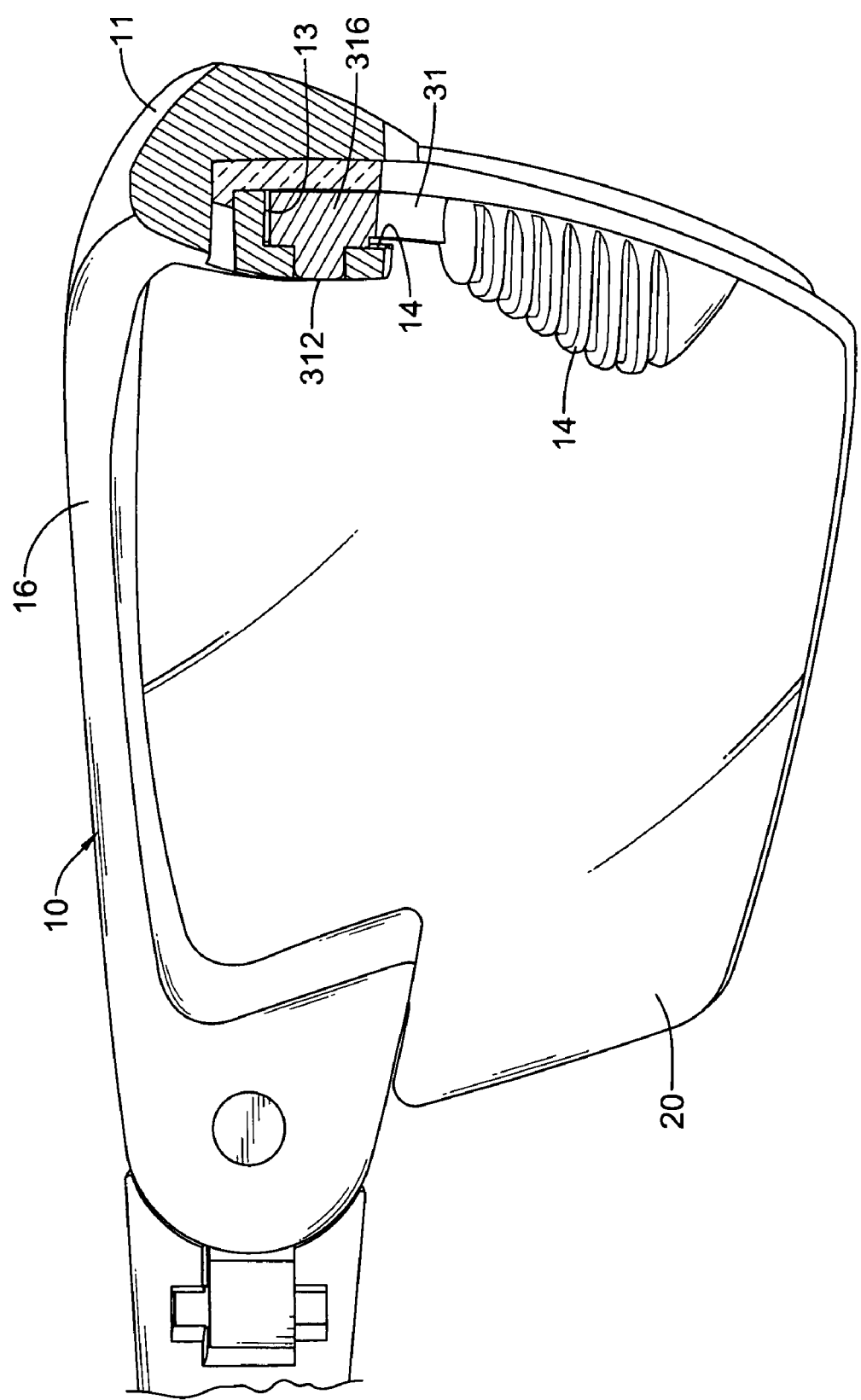
FIG. 5 is an enlarged partial cross-sectional side view of the spectacles in FIG. 1 with the nose pads in a default position.
Figure 6:
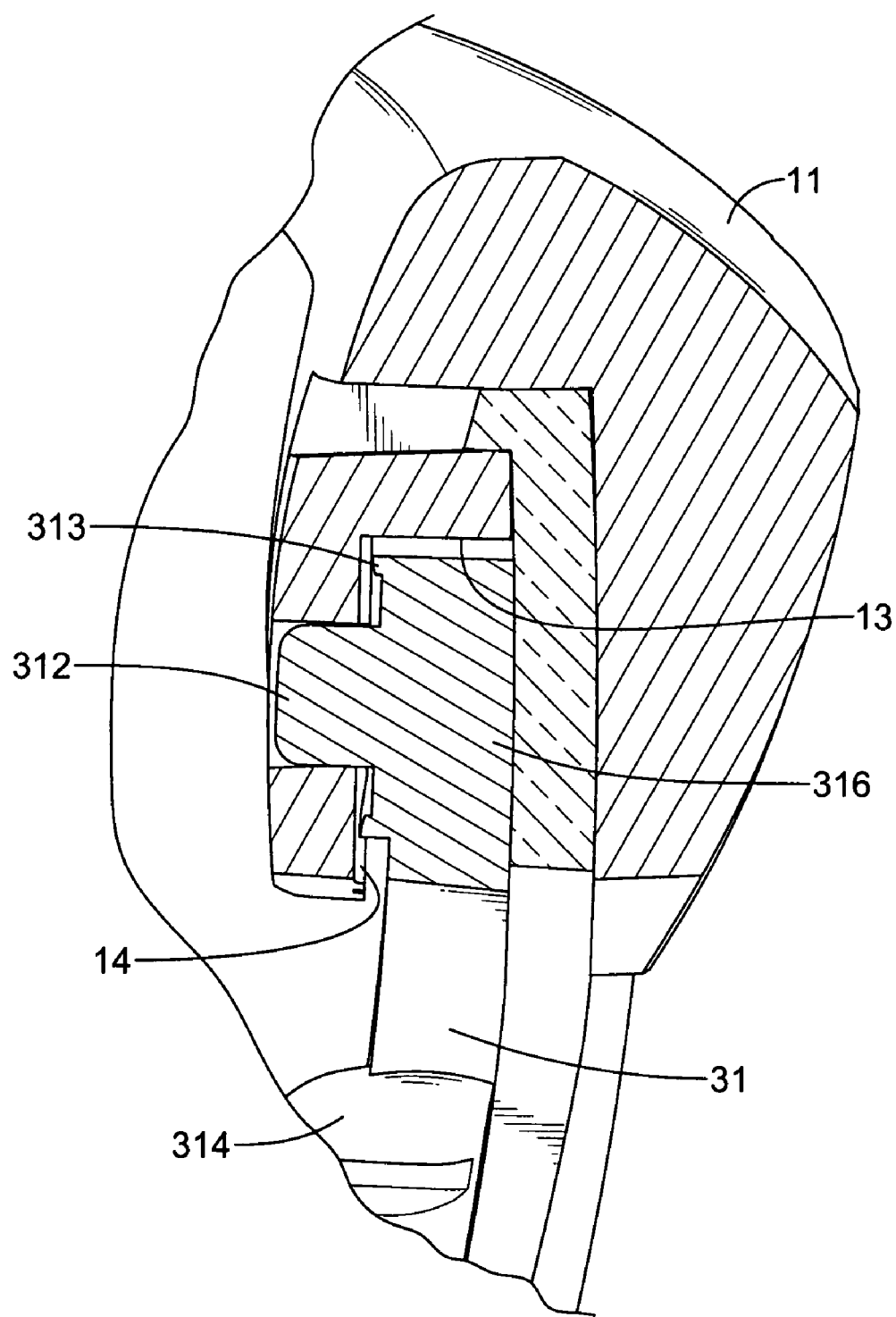
FIG. 6 is an enlarged cross-sectional side view of the spectacles in FIG. 1 with the nose pads being turned away from the default position.

With further reference to FIGS. 5 and 6, when the nose pads (311) are in a default position, the friction ribs (313) engage with and are retained in the limiting grooves (14) to hold the nose pads (311) in the default position. When the nose pads (311) are turned away from the default position, the friction ribs (313) are offset relatively to the limiting grooves (14) and tightly abut the inner wall of the mounting chamber (13), such that a stronger friction is formed between the friction ribs (313) and the inner wall of the mounting chamber (13) to firmly hold the nose pads (311) in a desired position. Thus, the angle between the nose pads (311) is reliably fixed. If the nose pads (311) are inadvertently moved away from the desired position, the person is able to easily return the nose pads (311) to the desired position without requiring any tools.

The flutes (314) are formed on the outer surface of the nose pad (31) to increase friction between the outer surface of the nose pad (31) and the nose of the person. Thus, preventing the spectacles from sliding down the person's nose.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. Spectacles with adjustable nose pads comprising
a frame having
two lens mounts each having
an inner end and
an outer end; and
a bridge connecting the inner ends of the lens mount and having
a rear and
a bottom;
a pair of lenses mounted on the lens mount;
a head holder mounted on the outer ends of the lens mounts; and
two nose pads attached to the bridge and each of the nose pads having
a top end;
an outer surface; and
a gear wheel formed on the top end of the nose pad, mounted rotatably on the bridge, adjacent to the other nose pad and having
a circumferential surface;
two opposite end faces, and at least one of the end faces abutting tightly with the bridge; and
multiple driving teeth formed on the circumferential surface of the gear wheel and meshing with the driving teeth on the gear wheel of the other nose pad.

2. The spectacles as claimed in claim 1, wherein
the bridge further has a mounting chamber formed inside the bridge and having
an inner wall;
an opening communicating with the bottom of the bridge;
two pivot holes formed in the inner wall of the mounting chamber;
the gear wheel of each nose pad is mounted in the mounting chamber of the bridge and has a shaft formed on and protruding from one of the end faces of the gear wheel and mounted rotatably in a corresponding pivot hole of the mounting chamber to rotate the gear wheel relative to the bridge; and
the end faces of the gear wheel of each nose pad abut tightly with the inner wall of the mounting chamber to abut tightly with the bridge.

3. The spectacles as claimed in claim 2, wherein
the mounting chamber further has
multiple limiting grooves formed in the inner wall of the mounting chamber; and
the gear wheel of each nose pad further has
multiple friction ribs formed on and protruding from at least one of the end faces of the gear wheel and selectively engaging with the limiting grooves in the inner wall of the mounting chamber.

4. The spectacles as claimed in claim 1, wherein each of the nose pads has multiple flutes formed on the outer wall of the nose pad.

5. The spectacles as claimed in claim 1, wherein the head holder is two temples respectively pivoted at the outer ends of the lens mounts.

6. The spectacles as claimed in claim 1, wherein the pair of lenses are a sole lens mounted on the lens mounts and spanning the bridge.

* * * * *